United States Patent
Lee et al.

(10) Patent No.: US 11,110,936 B2
(45) Date of Patent: Sep. 7, 2021

(54) METHOD FOR DIAGNOSING STICKING OF LUBRICATION CONTROL VALVE OF HYBRID VEHICLE

(71) Applicants: Hyundai Motor Company, Seoul (KR); Kia Motors Corporation, Seoul (KR)

(72) Inventors: Young Jun Lee, Seoul (KR); Woul Sun Choi, Hwaseong-si (KR); Ho Sun Jang, Cheongyang-gun (KR); Tae Hyung Koo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 318 days.

(21) Appl. No.: 16/396,533

(22) Filed: Apr. 26, 2019

(65) Prior Publication Data
US 2020/0180655 A1 Jun. 11, 2020

(30) Foreign Application Priority Data
Dec. 10, 2018 (KR) .......................... 10-2018-0158182

(51) Int. Cl.
*B60W 30/02* (2012.01)
*B60W 50/032* (2012.01)
*F16K 29/00* (2006.01)
*F16K 3/36* (2006.01)
(Continued)

(52) U.S. Cl.
CPC .......... *B60W 50/032* (2013.01); *B60W 50/10* (2013.01); *F16K 3/36* (2013.01); *F16K 29/00* (2013.01); *F16K 31/0651* (2013.01)

(58) Field of Classification Search
CPC ....... F16H 2059/683; F16H 2061/0034; F16H 57/0435; F16K 29/00; F16K 3/36; F16K 31/0651; B60W 50/032; B60W 50/10; Y02T 10/62; F16D 2500/5041; F16D 2500/5104; F16D 48/06; F16D 2500/3067;
(Continued)

(56) References Cited

U.S. PATENT DOCUMENTS

| | | | |
|---|---|---|---|
| 2014/0174573 A1* | 6/2014 | Matsunaga | F02M 25/0809 137/565.23 |
| 2015/0136253 A1* | 5/2015 | Kuwahara | F16D 25/14 137/596 |
| 2016/0363040 A1* | 12/2016 | Kim | F01P 11/14 |

(Continued)

*Primary Examiner* — Kenneth J Malkowski
(74) *Attorney, Agent, or Firm* — Slater Matsil, LLP

(57) ABSTRACT

In a hybrid vehicle, a hybrid type lubrication control valve which is a solenoid valve type turned on/off by electricity is used as a lubrication system component for circulating lubricating oil to a transmission and an engine clutch. A method includes measuring, by an engine clutch pressure sensor, first engine clutch engagement pressure in an off-state of the independent type lubrication control valve and second engine clutch engagement pressure in an on-state thereof; and determining, by the TCU, whether or not the independent type lubrication control valve is stuck, on the basis of a pressure difference between the first engine clutch engagement pressure and the second engine clutch engagement pressure. The method can diagnose a stuck state of the hybrid type lubrication control valve using hydraulic pressure for operating engine clutch engagement, before starting the vehicle.

6 Claims, 3 Drawing Sheets

(51) Int. Cl.
*F16K 31/06* (2006.01)
*B60W 50/10* (2012.01)

(58) Field of Classification Search
CPC ..... F16D 2500/3108; F16D 2500/3024; B60K 2006/4825; B60K 6/48
See application file for complete search history.

(56) References Cited

U.S. PATENT DOCUMENTS

| | | | |
|---|---|---|---|
| 2017/0166181 A1* | 6/2017 | Song | B60W 30/194 |
| 2017/0167596 A1* | 6/2017 | Nishimine | F16H 57/0435 |
| 2018/0187614 A1* | 7/2018 | Dudar | F02M 25/0827 |
| 2020/0072299 A1* | 3/2020 | Ishikawa | F16D 25/14 |

* cited by examiner

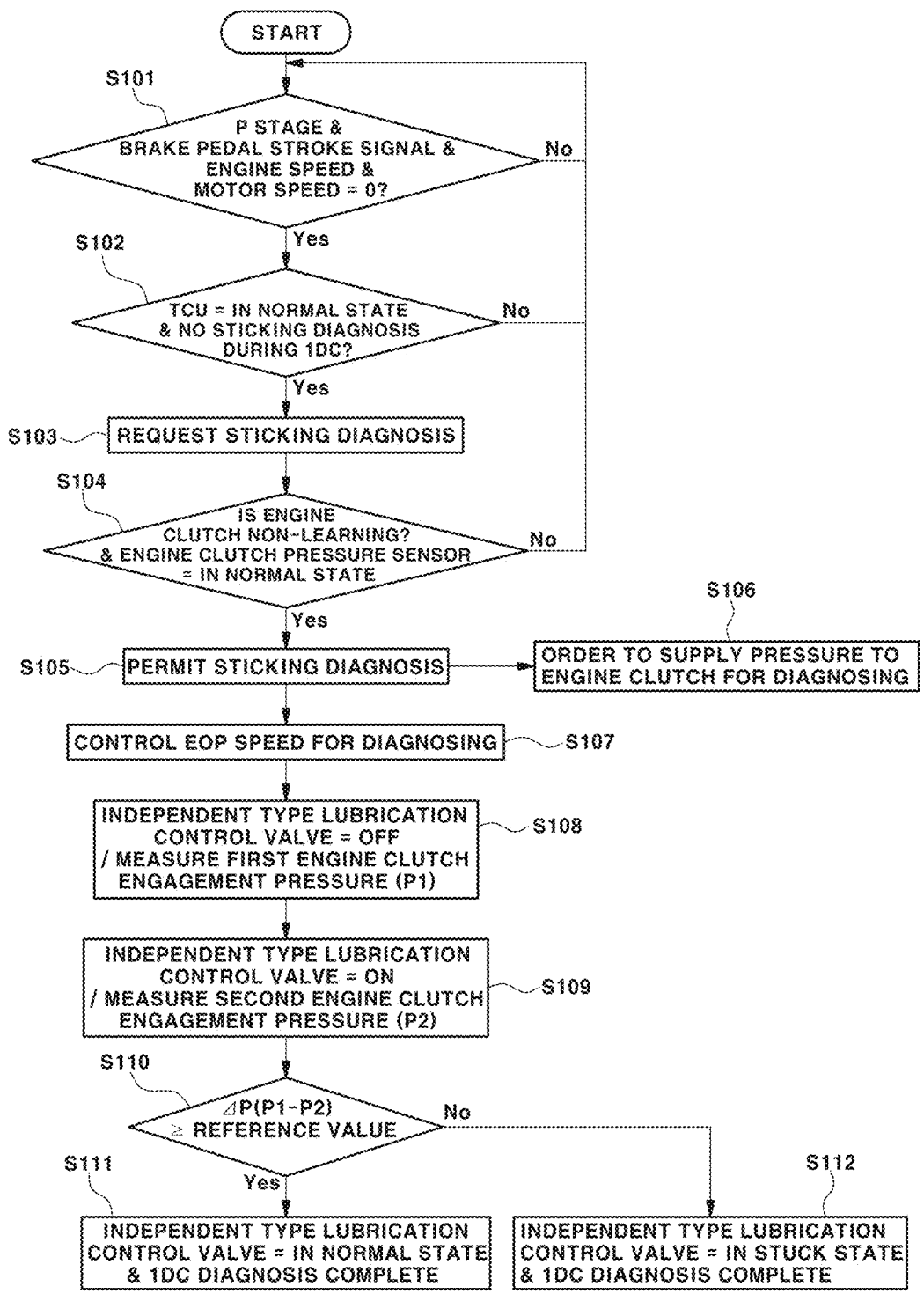

METHOD FOR DIAGNOSING STICKING OF LUBRICATION CONTROL VALVE OF HYBRID VEHICLE

CROSS REFERENCE TO RELATED APPLICATION

The present application claims priority to Korean Patent Application No. 10-2018-0158182, filed Dec. 10, 2018, the entire contents of which is incorporated herein for all purposes by this reference.

BACKGROUND

Field

The present disclosure relates to a method of diagnosing sticking of a lubrication control valve of a hybrid vehicle.

Description of the Related Art

Generally, hybrid vehicles include an engine and a motor which are connected in series, and further includes a power transmission device that includes an engine clutch provided between the engine and the motor for transmitting or blocking engine power, and an automatic transmission.

In addition, a lubrication system including an oil pump and an oil supply line for circulating lubrication oil is connected to the transmission and the engine clutch.

The foregoing is intended merely to aid in the understanding of the background of the present invention. And, Applicant does not admit that any information contained in this section constitutes prior art.

SUMMARY

One aspect of the present invention provides a method of diagnosing sticking of a lubrication control valve of a hybrid vehicle. The method can allow sticking of an independent type lubrication control valve which is turned on/off by electricity to be diagnosed using hydraulic pressure for operating engine clutch engagement, before starting the vehicle, thereby protecting an engine clutch and a clutch in a transmission from being damaged.

Another aspect of the invention provides a method of diagnosing sticking of a lubrication control valve of a hybrid vehicle, the method including:

by a transmission control unit (TCU), determining driving intent of a driver and requesting a hybrid control unit (HCU) for diagnosing sticking of an independent type lubrication control valve; determining, by the HCU, whether or not to permit a sticking diagnosis request of the TCU; ordering, by the HCU, motor speed control to a motor control unit (MCU) for controlling motor speed at a predetermined speed, after permitting the sticking diagnosis; driving, a motor at the predetermined speed by the motor speed control of the MCU; measuring, by the TCU, a drag torque acting on an input shaft of the transmission through an output shaft of the motor, by measuring a first drag torque in an off-state of the independent type lubrication control valve TQ1 and a second drag torque in an on-state thereof TQ2; and determining, by the TCU, whether or not the independent type lubrication control valve is stuck, on the basis of a torque difference $\Delta T$ between the first drag torque TQ1 and the second drag torque TQ2.

When the TCU receives a brake pedal stroke-off signal, a P-stage signal, a signal with a current vehicle speed of zero, engine speed of zero, and motor speed of zero, the TCU may determine that the driver does not intend to drive and request the HCU for the sticking diagnosis of the independent type lubrication control valve.

In addition, when the TCU is in a normal state possible to diagnose sticking and there is no sticking diagnosis during one driving cycle of the vehicle, the TCU may request the HCU for the sticking diagnosis of the independent type lubrication control valve.

In embodiments, the HCU may permit the sticking diagnosis for the independent type lubrication control valve in an engine clutch non-learning state.

In addition, after permitting sticking diagnosis, the HCU may control the engine to be forcibly turned off when engine starts before the motor speed control order is issued.

In the determining whether or not the independent type lubrication control valve is stuck, the TCU may compare the torque difference $\Delta T$ between the first drag torque TQ1 and the second drag torque TQ2 with a reference value, and then when the torque difference $\Delta T$ is equal to or higher than the reference value, the TCU may output that the independent type lubrication control valve is in a normal state.

In the determining whether or not the independent type lubrication control valve is stuck, after comparing the torque difference $\Delta T$ between the first drag torque TQ1 and the second drag torque TQ2 with the reference value, when the torque difference $\Delta T$ is less than reference value, the TCU may output that the independent type lubrication control valve is in a stuck and failed state.

Embodiments of the present invention provide following effects.

First, it is possible to easily diagnose whether the independent type lubrication control valve for controlling lubricating oil supply to the transmission and engine clutch is in a stuck state or not.

Second, when the independent type lubrication control valve is determined to be in the stuck state, the engine clutch can be protected by limiting slip driving thereof with a warning to guide maintenance, and burnout of the clutch in the transmission can be prevented or minimized.

BRIEF DESCRIPTION OF THE DRAWINGS

The above and other aspects, features and other advantages of the present invention will be more clearly understood from the following detailed description when taken in conjunction with the accompanying drawings, in which:

FIG. 3 is a flowchart showing a process for diagnosing sticking of the lubrication control valve of the hybrid vehicle.

DETAILED DESCRIPTION OF EMBODIMENTS

Figure 1:
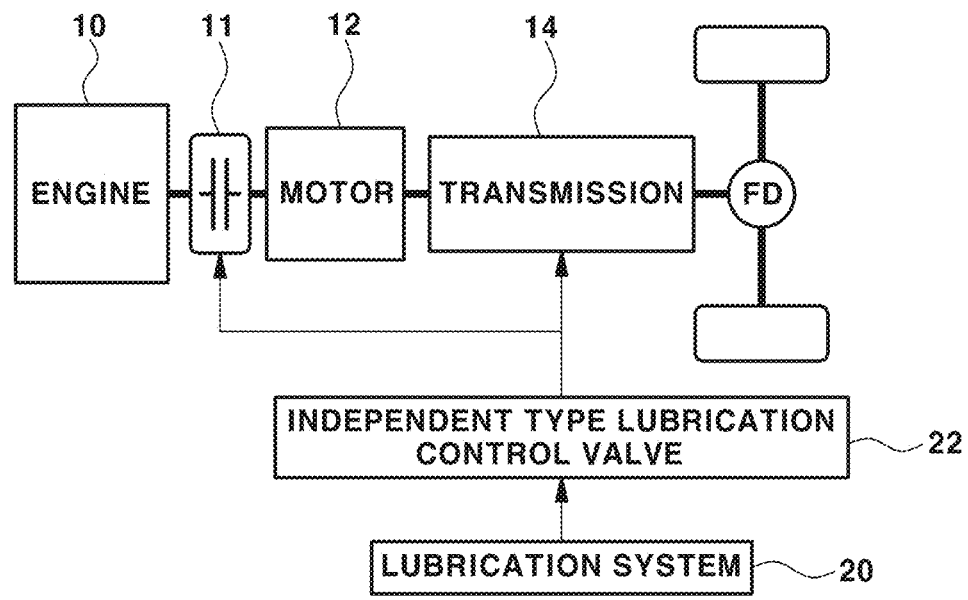
FIG. 1 is a block diagram showing a power train system of a hybrid vehicle.

Hereinbelow, embodiments of the present invention will be described in detail with reference to the accompanying drawings. Throughout the drawings, the same reference numerals will refer to the same or like parts.

Referring to FIG. 1, in one implementation of a hybrid vehicle, the hybrid vehicle includes an engine 10 and a motor 12 which are connected in series. The hybrid vehicle further includes an engine clutch 11 provided between the engine 10 and the motor 12 for transmitting or blocking engine power, and an automatic transmission 14 connected to the motor 12 and wheels.

In addition, a lubrication system 20 including an oil pump and an oil supply line for circulating lubrication oil is connected to the transmission 14 and the engine clutch 11.

Particularly, the oil supply line of the lubrication system 20 further has an independent type lubrication control valve 22, in embodiments, in addition to an existing lubrication control valve.

In order to increase in motor usage and to enlarge range of slip driving of the engine clutch, the independent type lubrication control valve 22 adopts the solenoid type valve that can be turned on/off, independently.

Therefore, by on-operation of the independent type lubrication control valve 22, the additional lubrication can be freely provided regardless of gear positions while it was possible that additional lubrication is supplied to the transmission 14 and the engine clutch at a first gear stage.

In one of lubrication control valves, by using a fail-safe logic, it can be indirectly determined whether the valve works or not, or whether the valve is stuck or not due to inability of gear shifting. However, in the independent type lubrication control valve 22, it would be hard to determine whether it is stuck or not.

In embodiments, sticking means an inoperative state where the solenoid type valve cannot physically move due to failure, when a control current is applied thereto.

Accordingly, when the sticking of independent type lubrication control valve is generated, the engine clutch or the clutch in the transmission lacks lubrication, thereby suffering engine clutch burnout or wear of the clutch in the transmission.

Figure 2:
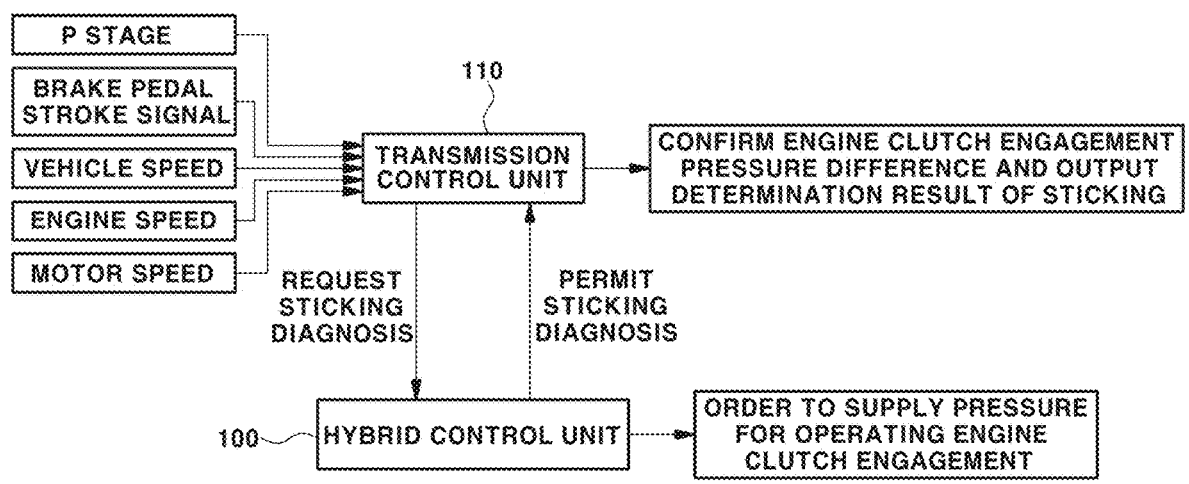
FIG. 2 is a block diagram showing a control configuration for diagnosing sticking of a lubrication control valve of the hybrid vehicle.

Accompanying FIG. 2 is a block diagram showing a control configuration for diagnosing sticking of a lubrication control valve of a hybrid vehicle according to embodiments of the present invention, and FIG. 3 is a flowchart showing a process for diagnosing sticking of the lubrication control valve of the hybrid vehicle according to embodiments of the present invention.

As shown in FIG. 2, diagnosing sticking of a lubrication control valve according to embodiments of the present invention is operated by cooperative control between a transmission control unit (TCU) 110, and a hybrid control unit (HCU) 100 which is an upper rank control unit.

The TCU 110 determines driving intention of a driver, on the basis of a brake pedal stroke signal, a current gear state, a current vehicle speed, an engine speed, and a motor speed.

In addition, when the TCU 110 receives a brake pedal stroke-off signal in a state in which a driver does not step on a brake pedal, a P-stage signal that is a current gear stage, a signal that is a current vehicle speed of zero, an engine speed of zero, and a motor speed of zero, the TCU 110 determines that the driver does not intend to drive and requests the HCU 100 for the diagnosing sticking of an independent type lubrication control valve.

In addition, when the TCU 110 is in a normal state possible to diagnose sticking and there is no sticking diagnosis during one driving cycle (1 DC) of the vehicle, the TCU 110 requests the HCU 100 for the sticking diagnosis of the independent type lubrication control valve.

When the TCU 110 requests the sticking diagnosis, the HCU 100 permits the sticking diagnosis for the independent type lubrication control valve depending on whether a learning engine clutch is operated and an engine clutch pressure sensor for sensing pressure acting on an engine clutch is normally operated or not.

In one implementation of a hybrid vehicle, processes of correcting friction coefficient of the clutch in consideration of degradation and abrasion due to aging of the engine clutch, or of correcting a gap regarding change of reaction force of a return spring for clutch operation are engine clutch learning, and the engine clutch learning operation may be performed in an ignition key starting on-state and an idle-state before starting the vehicle.

Thus, in order to prioritize the learning operation of the engine clutch, the HCU 100 permits the sticking diagnosis for the independent type lubrication control valve in a non-learning engine clutch state and in a normal state in which a signal of the engine clutch pressure sensor is normally received, the sensor sensing the pressure acting on the engine clutch operated by hydraulic pressure.

In addition, after permitting sticking diagnosis of the independent type lubrication control valve, the HCU 100 orders the TCU 110 to provide the pressure for operating engine clutch engagement.

Therefore, the TCU 110 turns on an electric oil pump which supplies the hydraulic pressure for operating the engine clutch engagement and controls an operating speed of the electric oil pump in accordance with pressure order for clutch engagement of the HCU.

Then, the engine clutch is engaged by the hydraulic pressure supplied from the electric oil pump, and engagement pressure at this time is measured by the engine clutch pressure sensor, by being measured in on and off states of the independent type lubrication control valve, respectively.

Specifically, in an off-state of the independent type lubrication control valve, first engine clutch engagement pressure P1 is measured by the engine clutch pressure sensor and transmitted to the TCU 110, and then in an on-state of the independent type lubrication control valve, second engine clutch engagement pressure is measured by the engine clutch pressure sensor and transmitted to the TCU 110.

Then, the TCU 110 calculates a pressure difference $\Delta P$ between the first engine clutch engagement pressure P1 which is measured in the off-state of the independent type lubrication control valve of the solenoid type valve and the second engine clutch engagement pressure P2 which is measured in the on-state thereof, and then compares the pressure difference $\Delta P$ with a reference value.

As a result, when the pressure difference $\Delta T$ is equal to or higher than the reference value, the TCU 110 determines that the independent type lubrication control valve normally performs on/off operation and outputs to a dashboard that the independent type lubrication control valve is in a normal.

As the independent type lubrication control valve is turned on and additional lubrication is normally generated from a lubrication system to a perturbation part configured for the engine clutch engagement (for example, a part of contacting with a piston which pressurizes a friction material of the engine clutch), the engine clutch is smoothly engaged as compared with before lubrication so that the pressure for engagement of the engine clutch does not increase. In contrast, as the independent type lubrication control valve is turned off and the additional lubrication is not generated from the lubrication system to the perturbation part, the pressure needs to be increased for engaging engine clutch as compared with during lubrication. Accordingly, when the pressure difference $\Delta P$ is equal to or higher than the reference value, the TCU 110 may determine that the independent type lubrication control valve is operated normally.

However, when the pressure difference $\Delta P$ is less than the reference value, the pressure for the engine clutch engagement during additional lubrication and the pressure for the engine clutch engagement before lubrication are not significantly different. Therefore, when the pressure difference ΔP is less than the reference value, the TCU 110 determines that the independent type lubrication control valve is stuck, and outputs to the dashboard that the independent type lubrication control valve is in a failure state.

Referring to FIGS. 2 and 3, sequence of the sticking diagnosis of the independent type lubrication control valve according to embodiments of the present invention is as follows.

First, the TCU 110 determines the driving intention of the driver on the basis of the brake pedal stroke signal, the current gear state, the current vehicle speed, the engine speed, and the motor speed (S101).

In embodiments, when the TCU 110 receives the brake pedal stroke-off signal in a state in which the driver does not step on the brake pedal, the P-stage signal that is the current gear stage, the signal with the current vehicle speed of zero, the engine speed of zero, and the motor speed of zero, the TCU 110 determines that the driver does not intend to drive.

Then, the TCU 110 self-checks whether or not to be in the normal state possible to diagnose sticking and also confirms that there is no sticking diagnosis during the one driving cycle (1 DC) of the vehicle (S102). Then, when the TCU 110 is in the normal state possible to diagnose sticking and there is no sticking diagnosis during the one driving cycle of the vehicle, the TCU 110 requests the HCU 100 for the sticking diagnosis of the independent type lubrication control valve (S103).

When there is the sticking diagnosis request of the TCU 110, the HCU 100 confirms whether the engine clutch performs the learning operation and the engine clutch pressure sensor is in normal state or not (S104) and permits the sticking diagnosis of the independent type lubrication control valve in the engine clutch non-learning state and the normal state of the engine clutch pressure sensor (S105).

The HCU 100 orders to the TCU the pressure for operating the engine clutch engagement (S106).

Accordingly, the TCU 110 turns on the electric oil pump which supplies the hydraulic pressure for operating the engine clutch engagement and controls an operating speed of the electric oil pump in accordance with the pressure order for the engine clutch engagement of the HCU (S107).

Next, the engagement pressure when the engine clutch is engaged by the hydraulic pressure supplied from the electric oil pump is measured by the engine clutch pressure sensor, by being measured in on and off states of the independent type lubrication control valve, respectively.

In embodiments, the engine clutch pressure sensor measures the first engine clutch engagement pressure P1 when the independent type lubrication control valve is turned off (S108) and transmits it to the TCU 110, and then measures the second engine clutch engagement pressure P2 when the independent type lubrication control valve is turned on and transmits it to the TCU 110 (S109).

Next, the TCU 110 calculates the pressure difference ΔP between the first engine clutch engagement pressure P1 measured in the off-state of the independent type lubrication control valve of the solenoid type valve and the second engine clutch engagement pressure P2 measured in the on-state of the independent type lubrication control valve of the solenoid type valve, and then compares the pressure difference ΔP with the reference value (S110).

In embodiments, when the pressure difference ΔP is equal to or higher than the reference value, the TCU 110 determines that the independent type lubrication control valve performs the on/off operation normally and outputs to the dashboard that the independent type lubrication control valve is in the normal state (S111).

However, when the pressure difference ΔP is less than the reference value, the TCU 110 determines that the independent type lubrication control valve is stuck and outputs to the dashboard that the independent type lubrication control valve is in the failure state (S112).

According to the embodiments discussed above, when it is determined that the independent type lubrication control valve is stuck, the driver can be informed of the failure state of the independent type lubrication control valve through the dashboard and be guided to repair the independent type lubrication control valve. In addition, the engine clutch can be protected by limiting slip driving of the engine clutch while driving to a service center, and clutch burnout in the transmission can be prevented, avoided or minimized.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of diagnosing sticking of a lubrication control valve of a hybrid vehicle, the method comprising:
   by a transmission control unit (TCU), determining driving intention of a driver;
   when determined that there is the driver's driving intention, requesting a hybrid control unit (HCU) to diagnose sticking of an independent type lubrication control valve;
   determining, by the HCU, whether or not to permit a sticking diagnosis request of the TCU;
   ordering, by the HCU, pressure to the TCU for operating clutch engagement to an engine clutch, after permitting the sticking diagnosis;
   by the TCU, turning on an electric oil pump which supplies fluid pressure for the engine clutch engagement and controlling an operating speed of the electric oil pump in accordance with pressure order for the engine clutch engagement of the HCU;
   measuring, by an engine clutch pressure sensor, engine clutch engagement pressure in a state in which the engine clutch is engaged by the fluid pressure supplied from the electric oil pump, by measuring first engine clutch engagement pressure in an off-state of the independent type lubrication control valve and second engine clutch engagement pressure in an on-state thereof; and determining, by the TCU, whether or not the independent type lubrication control valve is stuck, on the basis of a pressure difference between the first engine clutch engagement pressure and the second engine clutch engagement pressure.

2. The method of claim 1, wherein, when the TCU receives a brake pedal stroke-off signal, a P-stage signal, a signal with a current vehicle speed of zero, an engine speed of zero, and a motor speed of zero, the TCU determines that the driver has no intention of driving and requests the HCU for the sticking diagnosis of the independent type lubrication control valve.

3. The method of claim 1, wherein, when the TCU is in a normal state possible to diagnose sticking and there is no sticking diagnosis during one driving cycle of the vehicle, the TCU requests the HCU for the sticking diagnosis of the independent type lubrication control valve.

4. The method of claim 1, wherein the HCU permits the sticking diagnosis of the independent type lubrication control valve in a non-learning engine clutch state and a normal state of the engine clutch pressure sensor, after confirming whether the engine clutch performs learning operation and the engine clutch pressure sensor is in the normal state or not.

5. The method of claim 1, wherein, in the determining whether or not the independent type lubrication control valve is stuck, when the pressure difference is equal to or higher than a reference value, the TCU determines that on/off operation of the independent type lubrication control valve is normally performed and then outputs to a dashboard that the independent type lubrication control valve is in a normal state.

6. The method of claim 1, wherein, in the determining whether or not the independent type lubrication control valve is stuck, when the pressure difference is less than the reference value, the TCU determines that the independent type lubrication control valve is stuck and then outputs to the dashboard that the independent type lubrication control valve is in a stuck and failed state.

\* \* \* \* \*